(12) United States Patent
Pedersen et al.

(10) Patent No.: US 8,999,454 B2
(45) Date of Patent: Apr. 7, 2015

(54) DEVICE AND PROCESS FOR PRODUCING A REINFORCED HOLLOW FIBRE MEMBRANE

(75) Inventors: Steven Kristian Pedersen, Burlington (CA); John David Ireland, Burlington (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/427,052

(22) Filed: Mar. 22, 2012

(65) Prior Publication Data

US 2013/0251909 A1  Sep. 26, 2013

(51) Int. Cl.
  D01D 5/24  (2006.01)
  D01F 1/00  (2006.01)
  B01D 69/08  (2006.01)
  B01D 69/10  (2006.01)

(52) U.S. Cl.
  CPC ............ B01D 69/085 (2013.01); B01D 69/105 (2013.01); B01D 2325/40 (2013.01)

(58) Field of Classification Search
  USPC ...................................... 427/407.1
  See application file for complete search history.

(56) References Cited

U.S. PATENT DOCUMENTS

| | | | |
|---|---|---|---|
| 2,747,649 A | 5/1956 | Reed | |
| 2,936,482 A | 5/1960 | Kilian | |
| 3,494,121 A | 2/1970 | Bohrer | |
| 3,567,666 A | 3/1971 | Berger | |
| 3,547,721 A | 4/1971 | Dietzsch | |
| 3,615,024 A | 10/1971 | Michaels | |
| 3,673,028 A | 6/1972 | Pearson | |
| 3,676,193 A | 7/1972 | Cooper et al. | |
| 3,705,070 A | 12/1972 | Kim | |
| 3,745,142 A | 7/1973 | Mahlman | |
| 3,816,231 A | 6/1974 | Marshall | |
| 3,849,241 A | 11/1974 | Butin et al. | |
| 3,948,781 A | 4/1976 | Brun et al. | |
| 3,984,328 A | 10/1976 | Brun et al. | |
| 4,020,230 A | 4/1977 | Mahoney et al. | |
| 4,029,265 A | 6/1977 | Piper | |
| 4,061,821 A | 12/1977 | Hayano et al. | |
| 4,115,492 A | 9/1978 | Mahoney et al. | |
| 4,247,498 A | 1/1981 | Castro | |
| 4,253,936 A | 3/1981 | Leysen et al. | |
| 4,274,539 A | 6/1981 | Rabeneck et al. | |
| 4,299,083 A | 11/1981 | Igel et al. | |
| 4,335,193 A | 6/1982 | Doi et al. | |
| 4,340,480 A | 7/1982 | Pall et al. | |
| 4,384,047 A | 5/1983 | Benzinger et al. | |
| 4,399,035 A | 8/1983 | Nohmi et al. | |
| 4,405,688 A | 9/1983 | Lowery et al. | |
| 4,406,850 A | 9/1983 | Hills | |
| 4,541,981 A | 9/1985 | Lowery et al. | |
| 4,631,128 A | 12/1986 | Coplan et al. | |
| 4,664,681 A | 5/1987 | Anazawa et al. | |
| 4,666,607 A | 5/1987 | Josefiak et al. | |
| 4,702,836 A | 10/1987 | Mutoh et al. | |
| 4,707,265 A | 11/1987 | Barnes, Jr. et al. | |
| 4,741,829 A | 5/1988 | Takemura et al. | |
| 4,764,320 A | 8/1988 | Chan et al. | |
| 4,919,856 A | 4/1990 | Anazawa et al. | |
| 4,957,943 A | 9/1990 | McAllister et al. | |
| 5,011,588 A | 4/1991 | Rao et al. | |
| 5,013,339 A | 5/1991 | Mahoney et al. | |
| 5,022,990 A | 6/1991 | Doi et al. | |
| 5,032,282 A | 7/1991 | Linder et al. | |
| 5,034,129 A | 7/1991 | Ten Hove | |
| 5,066,401 A | 11/1991 | Muller et al. | |
| 5,139,529 A | 8/1992 | Seita et al. | |
| 5,143,312 A | 9/1992 | Baurmeister | |
| 5,151,191 A | 9/1992 | Sunaoka et al. | |
| 5,168,005 A | 12/1992 | Keating | |
| 5,171,493 A | 12/1992 | Aptel et al. | |
| 5,209,852 A | 5/1993 | Sunaoka et al. | |
| 5,232,597 A | 8/1993 | Eguchi | |
| 5,232,642 A | 8/1993 | Kamo et al. | |
| 5,238,562 A | 8/1993 | Rogut | |
| 5,240,610 A | 8/1993 | Tani et al. | |
| 5,271,883 A | 12/1993 | Timmons et al. | |

(Continued)

FOREIGN PATENT DOCUMENTS

| CA | 986422 | | 3/1976 |
|---|---|---|---|
| CA | 2 288 316 A1 | * | 5/2000 |

(Continued)

OTHER PUBLICATIONS

Jie Liu, Pingli Li et al. Preparation of PET threads reinforced PVDF hollow fiber membrane, Desalination, vol. 249, Issue 2, Dec. 15, 2009, pp. 453-457.

(Continued)

Primary Examiner — William Phillip Fletcher, III
(74) Attorney, Agent, or Firm — Scott Pundsack; Borden Ladner Gervais LLP

(57) ABSTRACT

A nozzle for making a reinforced hollow fibre membrane discharges one or more reinforcing yarns at or near a plane where the dope exits the nozzle, or in the same plane as a discharge opening of dope passage, or both. Multiple discrete yarn discharge openings may be spaced around a longitudinal axis of the nozzle. A reinforcing yarn passage remains generally free of dope during use. The dope may be discharged in an annular ring inside of the one or more reinforcing yarns, in an annular ring outside of the reinforcing yarns, or both. Minimal tension is required to pull the yarns through the nozzle, which helps to reduce distortion of the membrane cross section in a coagulation bath.

12 Claims, 7 Drawing Sheets

(56) References Cited

U.S. PATENT DOCUMENTS

| | | |
|---|---|---|
| 5,284,583 A | 2/1994 | Rogut |
| 5,294,338 A | 3/1994 | Kamo et al. |
| 5,303,550 A | 4/1994 | Setzer |
| 5,328,610 A | 7/1994 | Rogut |
| 5,332,498 A | 7/1994 | Rogut |
| 5,336,298 A | 8/1994 | Quinn et al. |
| 5,375,453 A | 12/1994 | Swei et al. |
| 5,376,273 A | 12/1994 | Pacheco et al. |
| 5,380,477 A | 1/1995 | Kent et al. |
| 5,385,777 A | 1/1995 | Higuchi et al. |
| 5,392,588 A | 2/1995 | Morrison |
| 5,435,955 A | 7/1995 | Kamei et al. |
| 5,470,659 A | 11/1995 | Baumgart et al. |
| 5,472,607 A | 12/1995 | Mailvaganam et al. |
| 5,474,680 A | 12/1995 | Eguchi |
| 5,489,406 A | 2/1996 | Beck et al. |
| 5,497,608 A | 3/1996 | Matsumoto et al. |
| 5,547,756 A | 8/1996 | Kamo et al. |
| 5,582,913 A | 12/1996 | Simons |
| 5,637,385 A | 6/1997 | Mizuki et al. |
| 5,651,888 A | 7/1997 | Shimizu et al. |
| 5,656,167 A | 8/1997 | Martz |
| 5,709,735 A | 1/1998 | Midkiff et al. |
| 5,716,689 A | 2/1998 | Rogut |
| 5,753,351 A | 5/1998 | Yoshida et al. |
| 5,782,959 A | 7/1998 | Yang et al. |
| 5,783,608 A | 7/1998 | Sugo et al. |
| 5,804,128 A | 9/1998 | Ogata et al. |
| 5,882,461 A | 3/1999 | Rogut |
| 5,888,605 A | 3/1999 | Hachisuka et al. |
| 5,914,039 A | 6/1999 | Mahendran et al. |
| 5,972,501 A | 10/1999 | Ohmory et al. |
| 6,015,495 A | 1/2000 | Koo et al. |
| 6,024,872 A | 2/2000 | Mahendran et al. |
| 6,048,641 A | 4/2000 | Ohmory et al. |
| 6,077,376 A | 6/2000 | Katraro et al. |
| 6,083,393 A | 7/2000 | Wu et al. |
| 6,090,731 A | 7/2000 | Pike et al. |
| 6,114,017 A | 9/2000 | Fabbricante et al. |
| 6,127,433 A | 10/2000 | Sugo et al. |
| 6,183,640 B1 | 2/2001 | Wang |
| 6,245,239 B1 | 6/2001 | Cote et al. |
| 6,264,044 B1 | 7/2001 | Meyering et al. |
| 6,273,271 B1 | 8/2001 | Moya |
| 6,280,791 B1 | 8/2001 | Meyering et al. |
| 6,354,443 B1 | 3/2002 | Moya |
| 6,354,444 B1 | 3/2002 | Mailvaganam et al. |
| 6,454,943 B1 | 9/2002 | Koenhen |
| 6,465,094 B1 | 10/2002 | Dugan |
| 6,495,663 B1 | 12/2002 | Rothbard et al. |
| 6,559,192 B2 | 5/2003 | Maccone et al. |
| 6,562,879 B1 | 5/2003 | Hatsuda et al. |
| 6,592,759 B2 | 7/2003 | Rabie et al. |
| 6,635,204 B2 | 10/2003 | Tanaka et al. |
| 6,746,627 B2 | 6/2004 | Niu et al. |
| 6,792,744 B2 | 9/2004 | Feuerlohn et al. |
| 6,802,971 B2 | 10/2004 | Gorsuch et al. |
| 6,890,435 B2 | 5/2005 | Ji et al. |
| RE39,176 E | 7/2006 | Dutt |
| 7,081,273 B2 | 7/2006 | Ji |
| 7,165,682 B1 | 1/2007 | Ji |
| 7,172,075 B1 | 2/2007 | Ji |
| 7,185,597 B1 | 3/2007 | Phillips et al. |
| 7,247,238 B2 | 7/2007 | Mullette et al. |
| 7,267,872 B2 | 9/2007 | Lee et al. |
| 7,306,105 B2 | 12/2007 | Shinada et al. |
| 7,413,804 B2 | 8/2008 | Lee et al. |
| 7,441,667 B2 | 10/2008 | Galvin et al. |
| 7,563,376 B2 | 7/2009 | Oishi |
| 7,776,214 B2 | 8/2010 | Saito et al. |
| 7,807,221 B2 | 10/2010 | Shinada et al. |
| 7,861,869 B2 | 1/2011 | Beckers et al. |
| 7,909,177 B2 | 3/2011 | Lee et al. |
| 2002/0046970 A1 | 4/2002 | Murase et al. |
| 2002/0090690 A1 | 7/2002 | Eddleman et al. |
| 2002/0111674 A1 | 8/2002 | Chouinard et al. |
| 2002/0155289 A1 | 10/2002 | Cistone et al. |
| 2003/0094409 A1 | 5/2003 | Minegishi et al. |
| 2003/0098275 A1 | 5/2003 | Mahendran et al. |
| 2003/0107150 A1 | 6/2003 | Hamanaka et al. |
| 2003/0192826 A1 | 10/2003 | Wang et al. |
| 2003/0197308 A1 | 10/2003 | Montoya |
| 2004/0073300 A1 | 4/2004 | Chouinard et al. |
| 2004/0078903 A1 | 4/2004 | Bruning et al. |
| 2004/0136894 A1 | 7/2004 | Yoshizawa et al. |
| 2005/0124249 A1 | 6/2005 | Uribarri |
| 2005/0189292 A1 | 9/2005 | Ward et al. |
| 2005/0205488 A1 | 9/2005 | Shinada et al. |
| 2006/0000766 A1 | 1/2006 | Ji |
| 2006/0175243 A1 | 8/2006 | Mahendran et al. |
| 2007/0084794 A1 | 4/2007 | Morikawa et al. |
| 2007/0262017 A1 | 11/2007 | Shinada et al. |
| 2008/0023125 A1 | 1/2008 | Arnold et al. |
| 2008/0210623 A1 | 9/2008 | McMahon et al. |
| 2008/0241451 A1 | 10/2008 | Beckers et al. |
| 2008/0292823 A1 | 11/2008 | Lee et al. |
| 2008/0305290 A1 | 12/2008 | Lee et al. |
| 2009/0068428 A1 | 3/2009 | Shinoda et al. |
| 2009/0314708 A1 | 12/2009 | Yeom |
| 2010/0024631 A1 | 2/2010 | Lee et al. |
| 2011/0114553 A1 | 5/2011 | Teramachi et al. |
| 2012/0018371 A1 | 1/2012 | Cote |
| 2012/0097604 A1 | 4/2012 | Cote et al. |
| 2012/0156485 A1 | 6/2012 | Palinkas et al. |
| 2012/0164447 A1 | 6/2012 | Kohinata |
| 2013/0153490 A1* | 6/2013 | Pedersen et al. .......... 210/500.23 |
| 2013/0158007 A1 | 6/2013 | Mickle et al. |
| 2013/0168007 A1 | 7/2013 | Cote et al. |
| 2013/0233788 A1 | 9/2013 | Vizvardi et al. |

FOREIGN PATENT DOCUMENTS

| | | |
|---|---|---|
| CA | 2288316 | 5/2000 |
| CA | 2474625 | 8/2003 |
| CA | 2478445 | 9/2003 |
| CA | 2478831 | 9/2003 |
| CA | 2630418 | 6/2007 |
| CH | 507012 | 5/1971 |
| CZ | 286263 B6 | 2/2000 |
| DE | 4142417 | 6/1992 |
| DE | 10211051 | 10/2003 |
| EP | 0241995 | 10/1987 |
| EP | 0761292 A1 | 3/1997 |
| EP | 0819467 | 1/1998 |
| EP | 0998972 | 5/2000 |
| EP | 1193292 | 4/2002 |
| EP | 1236503 | 9/2002 |
| EP | 1424157 A1 | 6/2004 |
| EP | 1658889 A1 | 5/2006 |
| EP | 0998972 B1 | 4/2007 |
| EP | 2301654 | 3/2011 |
| FR | 1511581 | 2/1968 |
| FR | 2616812 | 12/1988 |
| FR | 2336962 | 7/1997 |
| GB | 1325672 A | 8/1973 |
| GB | 1374704 | 11/1974 |
| GB | 2041821 | 9/1980 |
| JP | 53-039982 | 9/1974 |
| JP | 52137026 | 11/1977 |
| JP | 53028084 | 3/1978 |
| JP | 55137209 | 10/1980 |
| JP | 57005914 | 1/1982 |
| JP | 57-028139 | 2/1982 |
| JP | 58-004810 | 1/1983 |
| JP | 58-049408 | 3/1983 |
| JP | 58-093734 | 6/1983 |
| JP | 59196706 | 11/1984 |
| JP | 60137402 | 7/1985 |
| JP | 60139815 | 7/1985 |
| JP | 61-146811 | 7/1986 |
| JP | 62001404 | 1/1987 |
| JP | 62019206 | 1/1987 |
| JP | 62045318 | 2/1987 |
| JP | 62079806 | 4/1987 |

(56) References Cited

FOREIGN PATENT DOCUMENTS

| | | |
|---|---|---|
| JP | 62-133190 | 6/1987 |
| JP | 64-014315 | 1/1989 |
| JP | 2107318 | 4/1990 |
| JP | 2268816 | 11/1990 |
| JP | 04-265132 | 9/1992 |
| JP | 4265133 | 9/1992 |
| JP | 4293529 | 10/1992 |
| JP | 5301031 | 11/1993 |
| JP | 06-015152 | 1/1994 |
| JP | 06-246139 | 9/1994 |
| JP | 6246140 | 9/1994 |
| JP | 07-080263 | 3/1995 |
| JP | 07-116483 | 5/1995 |
| JP | 7157580 | 6/1995 |
| JP | 8165396 | 6/1996 |
| JP | 52082682 | 7/1997 |
| JP | 10-323546 | 12/1998 |
| JP | 11-319519 | 11/1999 |
| JP | 11348131 B2 | 12/1999 |
| JP | 2000-093768 | 4/2000 |
| JP | 2000288365 | 10/2000 |
| JP | 2001-062258 | 3/2001 |
| JP | 2003320584 A | 11/2003 |
| JP | 2008-114180 | 5/2008 |
| KR | 20040038473 A | 5/2004 |
| KR | 20110089621 A | 8/2011 |
| NL | 1010458 C2 | 4/2000 |
| TW | 200946323 A | 11/2009 |
| WO | WO 93/23153 | 11/1993 |
| WO | WO 99/01207 | 1/1999 |
| WO | 2009142279 | 11/1999 |
| WO | WO 00/78437 | 12/2000 |
| WO | WO 02/34373 | 5/2002 |
| WO | WO 03/059496 | 7/2003 |
| WO | WO 03/068374 | 8/2003 |
| WO | WO 03/076055 | 9/2003 |
| WO | WO 03/076056 | 9/2003 |
| WO | WO 03/097221 | 11/2003 |
| WO | WO 2004/009221 | 1/2004 |
| WO | WO 2004/089520 | 10/2004 |
| WO | WO 2005/002712 | 1/2005 |
| WO | 2005061081 | 7/2005 |
| WO | 2005082503 A1 | 9/2005 |
| WO | 2005113218 A1 | 12/2005 |
| WO | 2005118116 A1 | 12/2005 |
| WO | WO 2006053406 | 5/2006 |
| WO | WO 2006063426 | 6/2006 |
| WO | WO 2007116072 | 10/2007 |
| WO | WO 2008066340 | 6/2008 |
| WO | 2010062454 | 6/2010 |
| WO | WO 2010/081228 | 7/2010 |
| WO | 2010108285 A1 | 9/2010 |
| WO | WO 2010/108285 | 9/2010 |
| WO | WO 2010/148517 | 12/2010 |
| WO | 2012036935 | 3/2012 |

OTHER PUBLICATIONS

Search Report and Written Opinion from PCT/US2011/063332 dated Jul. 31, 2012.
Search Report and Written Opinion from PCT/US2011/050479 dated Nov. 25, 2011.
Caplan et al., Formation of microporous Teflon PFA membranes via thermally induced phase separation, Journal of Membrane Science, 130 (1997) p. 219-237.
Choi et al., Fabrication and characterization of multi-walled carbon nanotubes/polymer blend membranes, Journal of Membrane Science 284 (2006) p. 406-415.
Choi et al., Modification of Performances of Various Memranes Using MWNTs as a Modifier, Macromol. Symp. 2007, 249-250, p. 610-617.
English language abstact of JP 11-319519 to Nitto Denko Corp, published Nov. 24, 1999.
English language abstract of JP 04-265132 to Ube Ind Ltd, published Sep. 21, 1992.
English language abstract of JP 04265133 to Ube Ind Ltd, published Sep. 21, 1992.
English language abstract of JP 04293529 to Ube Ind Ltd, published Oct. 19, 1992.
English language abstract of JP 06-015152 to Tokuyama Soda Co Ltd, published Jan. 25, 1994.
English language abstract of JP 06-246139 to Dainippon Ink & Chem Inc, published Sep. 6, 1994.
English language abstract of JP 06246140 to Dainippon Ink & Chem Inc, published Sep. 6, 1994.
English language abstract of JP 07-080263 to Mitsubishi Rayon Co Ltd, published Mar. 28, 1995.
English language abstract of JP 07-116483 to Dainippon Ink & Chem Inc, published May 9, 1995.
English language abstract of JP 07157580 to Kawamura Inst of Chem Res Dainippon Ink & Chem Inc, published Jun. 20, 1995.
English language abstract of JP 08165396 to Kurabe Ind Co Ltd, published Jun. 25, 1996.
English language abstract of JP 10-323546 to Nitto Denko Corp, published Dec. 8, 1998.
English language abstract of JP 11-319519 to Nitto Denko Corp published Nov. 24, 1999.
English language abstract of JP 2000-093768 to NOK Corp, published Apr. 4, 2000.
English language abstract of JP 2000288365 to Torary Ind Inc, published Oct. 17, 2000.
English language abstract of JP 2001-062258, to Mitsubishi Rayon Co. Ltd, published 2001-3-2001.
English language abstract of JP 2008114180 to Mitsubishi Rayon Co Ltd, published May 22, 2008.
English language abstract of JP 2107318 to Daicel Chem, published Apr. 19, 1990.
English language abstract of JP 2268816 to Mitsubishi Rayon Co, published Nov. 2, 1990.
PCT Search Report dated Jun. 14, 2010 issued in connection with PCT Application No. PCT/CA2010/000469 which was filed on Mar. 26, 2010.
English language abstract of JP 52082682 to Asahi Chemical Ind, published Jul. 11, 1997.
English language abstract of JP 52137026 to Toyobo Co Ltd, published Nov. 16, 1977.
English language abstract of JP 5301031 to Daicel Chem, published Nov. 16, 1993.
English language abstract of JP 53028084 to Nitto Electric Ind Co, published Mar. 15, 1978.
English language abstract of JP 53-039982 to Kunyu, published Sep. 3, 1974.
English language abstract of JP 55137209 to Mitsubishi Rayon Co Ltd, published Oct. 25, 1980.
English language abstract of JP 57005914 to Mitsubishi Rayon Co Ltd, published Jan. 12, 1982.
English language abstract of JP 57-028139 to Asahi Chem Ind Co Ltd, published Feb. 15, 1982.
English language abstract of JP 58-004810 to Toyobo Co Ltd, published Jan. 12, 1983.
English language abstract of JP 58-049408 to Nitto Electric Ind Co Ltd, published Mar. 23, 1983.
English language abstract of JP 58-093734 to Asahi Kasei Kogyo KK, published Jun. 3, 1983.
English language abstract of JP 59196706 to Dainippon Ink & Chem Inc Kawamura Inst of Chem Res, published Nov. 8, 1984.
English language abstract of JP 60137402 to Mitsubishi Rayon Co Ltd, published Jul. 22, 1985.
English language abstract of JP 60139815 to Mitsubishi Rayon Co Ltd, published Jul. 24, 1985.
English language abstract of JP 61-146811 to Ube Ind Ltd, published Jul. 4, 1986.
English language abstract of JP 62001404 to Mitsubishi Rayon Co, published Jan. 7, 1987.
English language abstract of JP 62019206 to Dainippon Ink & Chem Inc, published Jan. 28, 1987.
English language abstract of JP 62045318 to Dainippon Ink & Chem Inc, published Feb. 27, 1987.

(56) References Cited

OTHER PUBLICATIONS

English language abstract of JP 62079806 to Ube Ind Ltd, published Apr. 13, 1987.
English language abstract of JP 62-133190 to Toagosei Chem Ind Co Ltd, published Jun. 16, 1987.
English language abstract of JP 64-014315 to Mitsubishi Rayon Co Ltd, published Jan. 18, 1989.
Ramaswamy et al., Fabication of poly (ECTFE) membranes via thermally induced phase separation, Journal of Membrane Science, 210 (2002) p. 175-180.
Lin et al., Microporous PVDF membrane formation by immersion precipitation from water/TEP/PVDF system, Desalination, 145 (2002) p. 25-29.
Lloyd et al., Microporous membrane formation via thermally-induced phase separation. II. Liquid-liquid phase separation, Journal of Membrane Science, 64 (1991) p. 1-11.
Lloyd, Douglas R., Microporous membrane formation via thermally induced phase separation. I. Solid-liquid phase separation, Journal of Membrane Science, 52 (1990) p. 239-261.
Inoue Shoten KK, English language abstract of JP2003320584, published Nov. 11, 2003.
Sung Cheol, English language abstract of KR20110089621, published Aug. 9, 2011.
Guo-Chang, English language abstract of TW200946323, published Nov. 16, 2009.
Schunk Ultraschalltechnik GmgH, English language abstract of CZ286263, published Feb. 16, 2000.
Murata Manufacturing Co, English language abstract of JP11348131, published Dec. 21, 1999.
Tsujino, Jiromaru et al., Welding of Flat Copper Braid Wire Specimens Using Ultrasonic Complex Vibration—Direct Machining of Terminal Parts on Flat Braided Wires, Ultrasonics Symposium, IUS 2008. IEEE, Nov. 2-5, 2008.
Elke, English language abstract of EP1424157, published Jun. 2, 2004.
Search Report and Written Opinion from corresponding PCT Application No. PCT/US2013/026979 dated Jun. 21, 2013.
PCT Search Report and Written Opinion dated May 13, 2013 from PCT Application No. PCT/US20131025110.
PCT Search Report and Written Opinion dated Mar. 28, 2013 from PCT Application No. PCT/US2012/065648.
PCT Search Report dated Oct. 16, 2013 from PCT Application No. PCT/US2013/053891.

* cited by examiner

SECTION B-B

SECTION C-C

DEVICE AND PROCESS FOR PRODUCING A REINFORCED HOLLOW FIBRE MEMBRANE

FIELD

This specification relates to devices and processes for producing reinforced hollow fiber membranes, for example hollow fiber membranes for use in microfiltration or ultrafiltration.

BACKGROUND

Hollow fiber membranes can be made from a variety of polymers by different methods. One method involves non-solvent induced phase separation (NIPS) as taught for example in U.S. Pat. Nos. 3,615,024; 5,066,401; and, 6,024,872. Another method involves thermally induced phase separation (TIPS) as taught for example in U.S. Pat. Nos. 4,702,836 and 7,247,238. The membranes may have separation layers on their inner surfaces or their outer surfaces and may be used, for example, for microfiltration (MF) or ultrafiltration (UF).

The strength of a hollow fiber membrane can be increased by coating a membrane dope on a pre-formed tubular braid. U.S. Pat. Nos. 5,472,607 and 6,354,444 to Mahendran et al. teach coating a membrane on the outside of a braid with limited penetration. U.S. Pat. No. 4,061,861 to Hayano et al., U.S. Pat. No. 7,267,872 to Lee et al., and U.S. Pat. No. 7,306,105 to Shinada et al. also teach braid supported membranes. Hollow fiber membranes made according to the teachings of Mahendran et al. have been successfully commercialized.

Another approach that has been proposed for making a reinforced hollow fiber membrane involves embedding fibers within the wall of a hollow fiber while the hollow fiber is being cast. US Publication 2002/0046970 to Murase et al., International Publication WO 03/097221 to Yoon et al. and U.S. Pat. No. 6,454,943 to Koenhen describe methods of embedding a monofilament or a multi-filament yarn longitudinally within the wall of a hollow fiber.

INTRODUCTION

The following introduction is intended to introduce the reader to the detailed description to follow and not to limit or define the claims.

This specification will describe an alternative device and process for making a reinforced membrane in which one or more reinforcing yarns are embedded in the walls of the hollow fibre membrane. The resulting membrane may be used, for example, to provide water treatment by microfiltration or ultrafiltration.

A hollow fibre spinning nozzle described in the specification discharges one or more reinforcing yarns from one or more yarn passages with openings at or near a plane where the dope exits the nozzle. Alternatively or additionally, a discharge opening of a yarn passage may be in or near the same plane as a discharge opening of dope passage. A dope passage may be located inside of the one or more yarn passages, outside of the one or more yarn passages, or both. There is no dope inlet to the one or more yarn passages and, preferably, there is essentially no dope in the one or more yarn passages when the nozzle is in use.

A reinforcing yarn is typically a multifilament yarn, but may also be a monofilament. If there are multiple reinforcing yarns, there may be multiple discrete yarn discharge openings spaced in a ring around a longitudinal axis of the nozzle. Optionally, a reinforcing yarn comprises filaments having a polymer, at least on the outer surface of the filaments, that is wetted by the dope; a surface treatment that increases wetting by the dope; or, both. Optionally, a reinforcing yarn may be wetted with a solvent before it contacts the dope.

In some of the prior art methods of making reinforced hollow fibre membranes, the reinforcement is pulled into a passage through a spinneret, passes through dope that is injected into the same passage, and then exits the passage with some of the dope. In these prior art methods, dope tends to leak out of the spinneret from an inlet orifice where the reinforcement enters the spinneret. This problem is inherent because the dope is under pressure and the reinforcement enters the spinneret from ambient atmospheric pressure. Attempting to solve this problem with sealing devices is complicated and can cause fraying and damage to the reinforcement. In contrast, discharging a reinforcing yarn from a yarn passage at or near a plane where the dope exits a nozzle, or in or near the plane of a discharge opening of a dope passage, as described in this specification, places the reinforcing yarn in communication with the dope where the dope is at or near atmospheric pressure. This at least reduces the tendency for dope to leak out of the nozzle through the yarn passage.

Some of the prior art methods pass reinforcements through an annular dope passage. Although the reinforcements may enter the dope passage with a preferred spacing or placement, the reinforcements may move relative to each other in the annular dope passage. Accordingly, multiple reinforcements do not necessarily exit the spinneret equally spaced from each other. Optionally discharging multiple reinforcing yarns through discrete spaced openings at or near a plane where the dope exits the nozzle, as described in this specification, tends to result in more evenly spaced reinforcing yarns.

The inventors have also observed that a material amount of force is required to pull a reinforcement through a passage filled with dope in a spinneret. The cross section of a membrane made from such a spinneret also tends to be distorted relative to a desired annular cross section. Without intending to be limited to any particular theory, the inventors believe that tension applied to a forming membrane as it passes around a roller in a coagulation bath tends to distort the cross section of the resulting hollow fibre membrane. Since the dope is viscous, pulling the reinforcement through a reservoir of dope that is not flowing at the membrane making line speed puts the reinforcing yarns under a material amount of tension. A nozzle tested in this specification resulted in a significant reduction in the force required to pull reinforcing yarns through the nozzle at a given line speed. These results suggest that a nozzle that discharges a reinforcing yarn from a yarn passage at or near a plane where the dope exits the nozzle, or in or near the plane of a discharge opening of a dope passage, without injecting dope into the yarn passage, will help produce a hollow fibre membrane with an embedded reinforcing yarn and a generally annular cross section.

DETAILED DESCRIPTION

Figure 1:
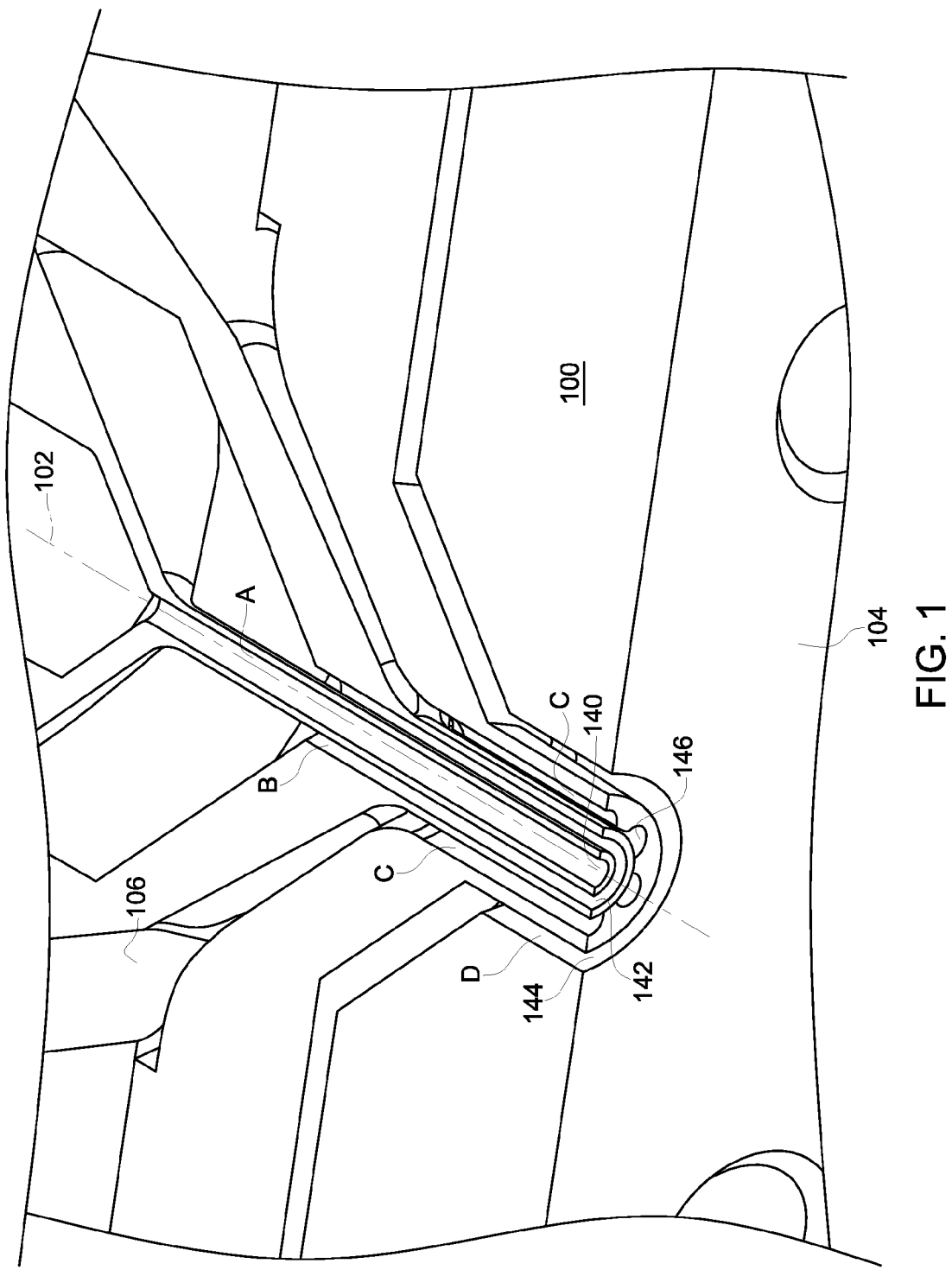
FIG. 1 is an isometric view of a nozzle for making a reinforced hollow fibre membrane, with the nozzle cut along its longitudinal axis.

FIG. 1 shows a nozzle 100 cut open along a plane parallel to its longitudinal axis 102. Internal passages in the nozzle 100 provide a number of zones for moving different materials through the nozzle 100. These passages all discharge through discharge openings located in a common plane defined by the front face 104 of the nozzle 100. The nozzle 100 is typically located in use with its front face 104 oriented horizontally. The different materials are discharged vertically downwards from the nozzle 100 and fall through an air gap into a coagulation bath to form a membrane.

Starting at the longitudinal axis 102, the first zone A carries a bore fluid along the longitudinal axis 102. The bore fluid may be a liquid or a gas, such as air, and is used to form a lumen within the resulting membrane.

The second zone B carries a membrane dope. In general, the dope is a mixture of one or more polymers which will form the membrane wall in a solvent. There may also be other minor ingredients such as a non-solvent or weak non-solvent and a hydrophilic additive.

The third zone C carries one or more reinforcing yarns. The reinforcing yarns are described further below in relation to FIG. 10. Zone C is preferably subdivided, at least where it opens to the front face 104 of the nozzle 100, into a plurality of discrete passages. Typically, one or more reinforcing yarns pass through each discrete passage although one or more of the passages may optionally be left empty. The passages in zone C also communicate with a solvent passage 106. The solvent passage 106 is used to inject a solvent, typically the same solvent that is used in the membrane dope, into the reinforcing yarn passages. This solvent pre-wets the reinforcing yarns, reduces a flow of air through zone C, and also helps prevent dope from entering the reinforcing yarn passages.

The fourth zone D carries a second flow of membrane dope. Optionally, zones B and D may be in communication with each other inside of the nozzle 100 so that one dope inlet can feed both of zones B and D. Dope can be injected into the nozzle 100 from a pot pressurized with nitrogen, or using a positive displacement pump. The dope may be provided at a temperature in the range of about 15 to 200 degrees C. and at a pressure in the range of about 20 to 400 kPa.

In use, annular streams of membrane dope are discharged from zones B and D through the front face 104 of the nozzle 100. At the same time, one or more reinforcing yarns are pulled through the nozzle by a force applied by a take up winder on the resulting membrane. The one or more reinforcing yarns are discharged from the front face 104 of the nozzle 100 between the two dope flows. The two dope flows merge with each other immediately outside of the nozzle 100 to form a single annular flow of dope. The one or more reinforcing yarns are embedded in the dope.

The dope and reinforcing yarn drop through an air gap into a coagulation bath. The coagulation bath is typically a tank equipped with rollers at the bottom and at the top as is known for membrane coagulation. A powered take-up winder receives the membrane emerging from the coagulation bath, optionally after the membrane passes through other unit processes such as a rinsing bath. The take up winder typically has a traverse guide to evenly populate a bobbin. The take up winder operates at an adjustable speed, typically between 1 and 30 m/min, that is matched to the downward velocity of dope being discharged through the nozzle 100. The take up winder also pulls the one or more reinforcing yarns through the nozzle 100. This results in the one or more reinforcing yarns being under tension between the nozzle 100 and the take up winder in an amount equal to the force required to pull the one or more reinforcing yarns through the nozzle 100.

FIGS. 2 to 9 show a second nozzle 110. The second nozzle 110 is similar to nozzle 100 but it has an additional plate 112 at the front of the second nozzle 110. The front face 104 of the second nozzle 110 is defined by the front of the plate 112. A bore fluid needle 114, providing a zone A, is also extended to the front of the plate 112. Zones B, C and D as described in relation to the nozzle 100 of FIG. 1 are also provided in the second nozzle 110. However, the discharge openings for zones B, C and D are set back from the front face 104 by the thickness of the plate 112. Other features of the detailed construction of the second nozzle 110 shown in FIGS. 2 to 9 are also used with the nozzle 100 of FIG. 1.

Figure 2:
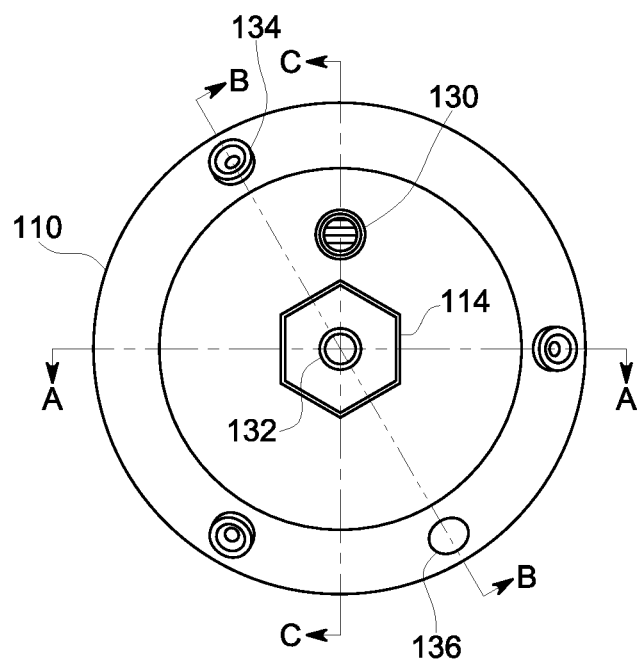
FIG. 2 is a back view of another nozzle for making a reinforced hollow fibre membrane.
Figure 3:
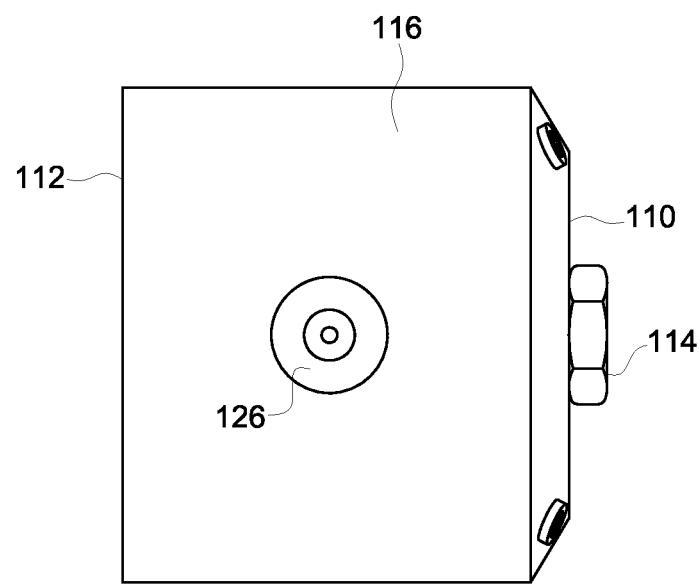
FIG. 3 is a side view of the nozzle of FIG. 2.
Figure 4:
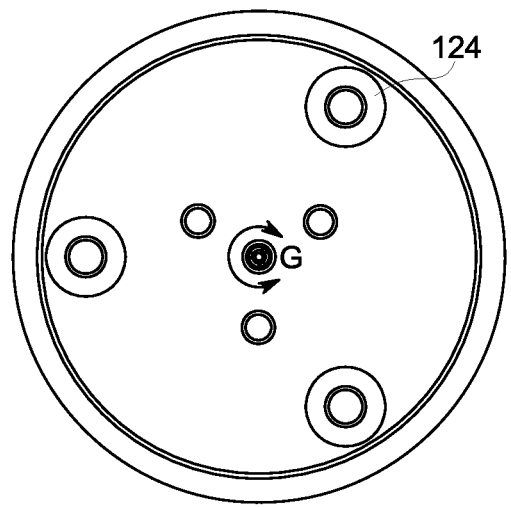
FIG. 4 is a front view of a nozzle of FIG. 3.
Figure 5:
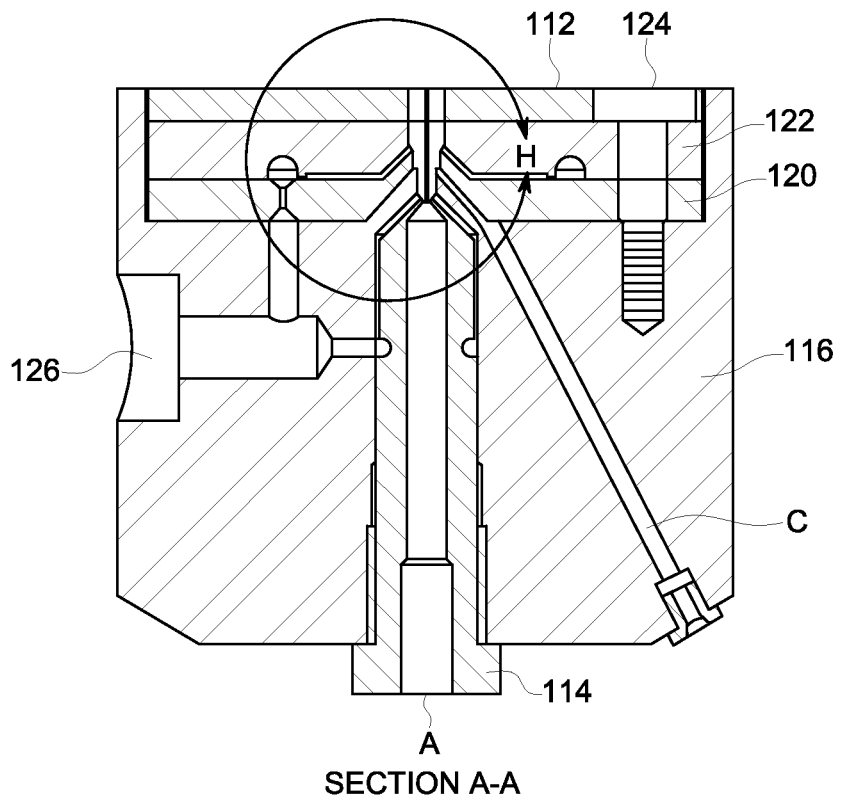
FIG. 5 is a cross section of the nozzle of FIG. 2 along the line A-A in FIG. 2.
Figure 6:
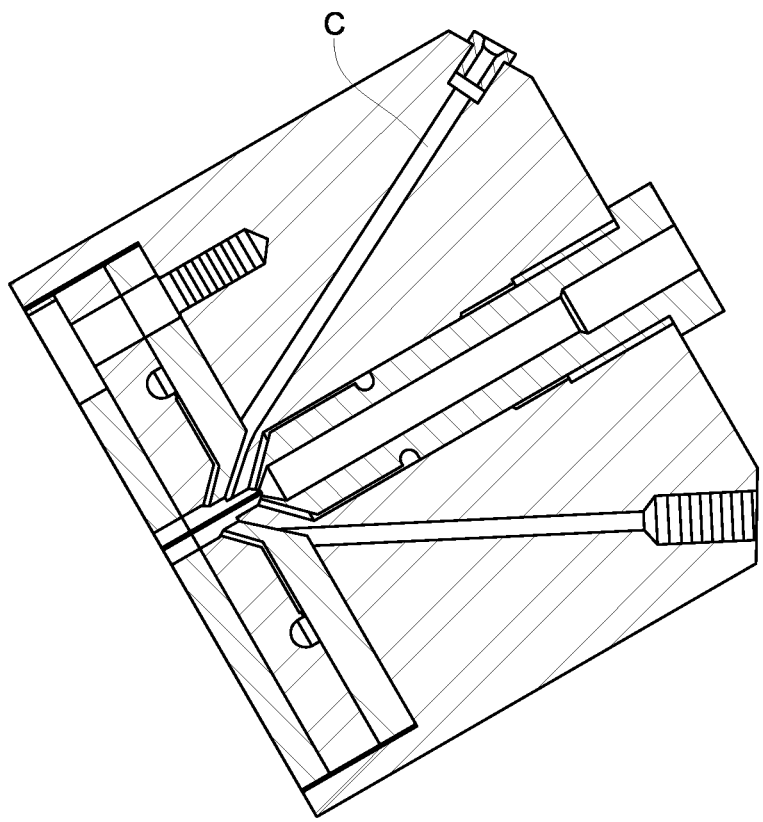
FIG. 6 is a cross section of the nozzle of FIG. 2 along the line B-B in FIG. 2.
Figure 7:
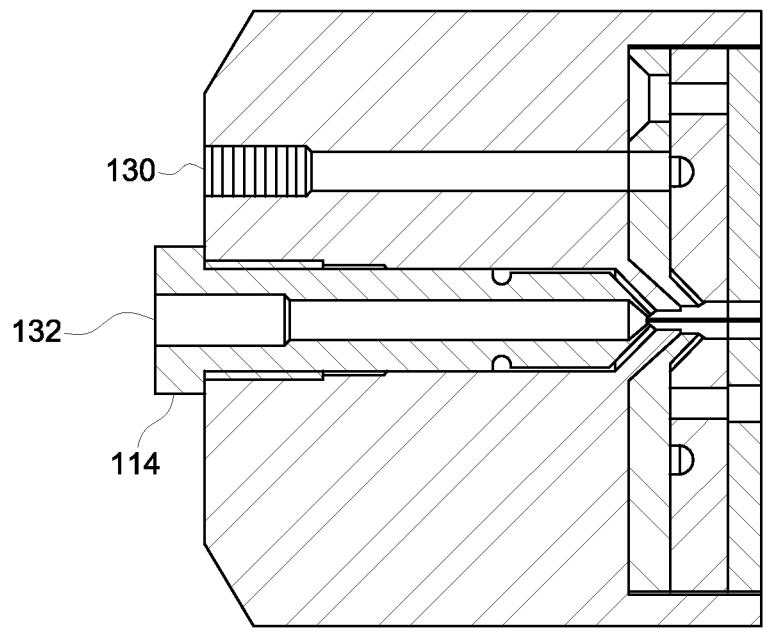
FIG. 7 is a cross section of the nozzle of FIG. 2 along the line C-C in FIG. 2.

Referring for example to FIGS. 2 and 3, the primary components of the second nozzle 110 are a main body 116, the bore fluid needle 114, a first insert 120, a second insert 122 and the plate 112. The bore fluid needle 114 threads into the main body 116 from the back. The first insert 120, second insert 122 and plate 112 are inserted into a recess at the front of the main body 116 and held in with screws (not shown) to be threaded into screw holes 124. A bypass connector 126 is drilled into the side of the main body 116 to connect zones D and B inside of the main body 116 and then plugged.

Figure 8:
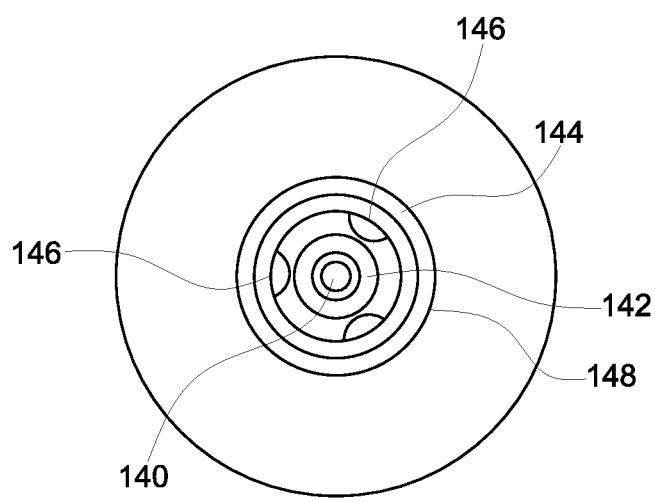
FIG. 8 is an enlarged view of the area G shown in FIG. 4.
Figure 9:
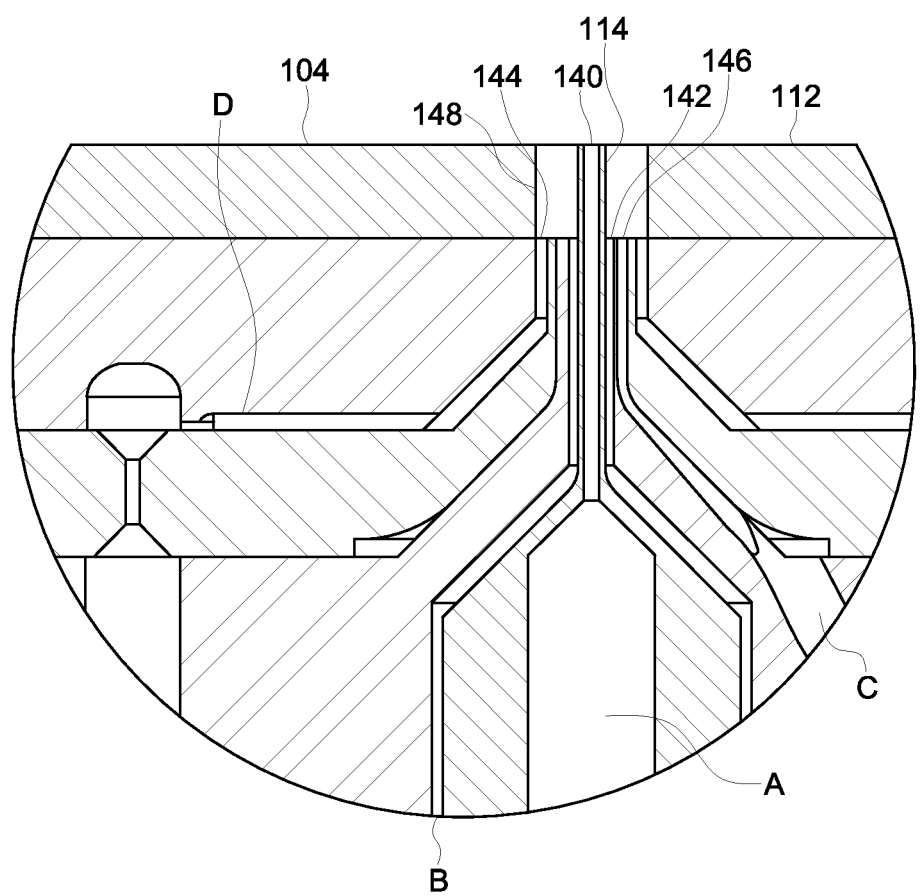
FIG. 9 is an enlarged view of the area H shown in FIG. 5.

Referring to FIG. 2, a dope inlet 130 provides dope to both of zones B and D. A bore fluid inlet 132 allows bore fluid to be provided to the needle 114. Reinforcing yarns enter the main body through ceramic guides 134, one for each distinct reinforcing yarn passage. Solvent enters the main body 116 through a plurality of solvent inlets 136. Referring primarily to FIGS. 8 and 9, bore fluid exits the needle 114 from a bore fluid outlet 140. Dope exits zones B and D through first and second dope passage discharge outlets 142 and 144 respectively. Reinforcing yarns exit zone C through yarn discharge outlets 146. Dope from the two zones B and D merges together around the reinforcing yarns in an annular space between the needle 114 and an outlet bore 148 in the plate 112.

Referring to FIGS. 1 to 9, both nozzles introduce reinforcement yarns into the membrane dope from yarn passages that are not connected to a supply of dope. The yarn discharge openings 146 are at or near the plane where the dope exits the nozzle 100, 110 at the front face 104, for example within 5 mm of the front face 104. Alternatively or additionally, the yarn discharge openings 146 are at or near to the dope discharge openings 142, 144, for example within 3 mm of the dope discharge openings 142, 144. When multiple reinforcement yarns are deployed they can be discharged from discrete yarn discharge openings 146 spaced evenly around the needle 114 at or near the front face 104 of the nozzle 100, 110.

The two nozzles 100, 110 differ in that in the second nozzle 110 the yarn discharge openings 146 are setback from the front face 104, which defines the discharge plane of the second nozzle 110 as a whole. Without setback, as in nozzle 100, the reinforcing filaments are introduced to the dope at the discharge plane of the nozzle. In this case, the reinforcing yarns exit from their passageways where the dope pressure is essentially atmospheric. As the yarn discharge openings 146 and dope discharge openings 142, 144 are moved back from the discharge plane, as in the second nozzle 110, the reinforcing yarn is discharged into an area of higher dope pressure. Some dope pressure may be desirable to minimize air entrained into the product membrane with the reinforcing yarn. However, the dope pressure at the yarn discharge openings 146 is preferably kept below a threshold at which the dope would flow back through the reinforcing yarn passage when the nozzle is in operation.

Figure 10:
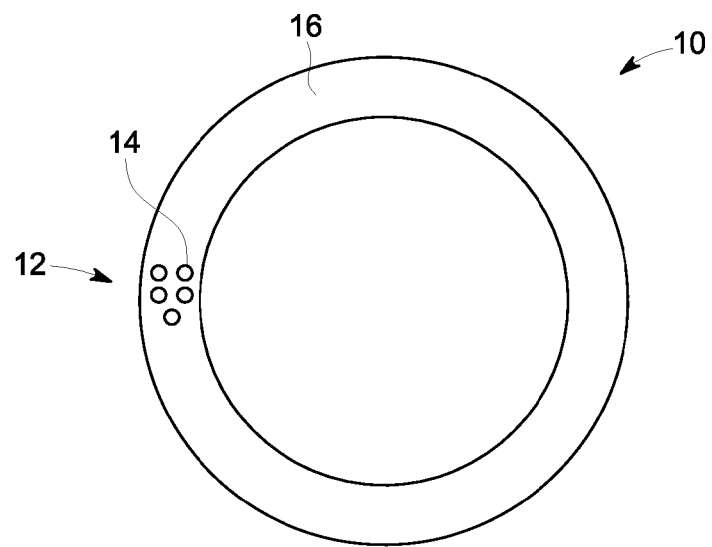
FIG. 10 is a cross section of a hollow fibre membrane that may be produced from the nozzle of FIG. 1 or the nozzle of FIGS. 2 to 9.

Referring to FIG. 10, a hollow fiber membrane 10 produce from either of the nozzles 100, 110 has a membrane wall 16 made from the dope of zones B and D. The membrane wall 16 has one or more reinforcing yarns 12 embedded in it. The reinforcing yarns 12 may be made up of individual filaments 14. Individual filaments 14 are preferably long continuous filaments rather than, for example, staple fibres.

The specific membrane 10 shown in FIG. 1 has one reinforcing yarn 12, but there may be a plurality of reinforcing yarns 12, for example between two and eight. Each reinforcing yarn 12 is preferably a multi-filament yarn made of continuous thermoplastic filaments 14. The filaments are preferably grouped together but without sufficient twisting to be classified as a twisted yarn. Other types of yarns or threads, or a monofilament, might also be used but they are not preferred.

Filaments 14 can be made from polymeric fibers such as polyethylene, polypropylene, polyester, nylon or PVDF. Filaments 14 can be bi-component filaments with a first part, preferably a complete outer layer or sheath, made of a first polymer that is wetted by a membrane forming dope. For example, a reinforcing filament 14 may have an outer layer or other part made of a polymer that is soluble in a solvent used in the membrane dope. In particular, the outer layer or other part may comprise a polymer that is also present in the membrane dope. A second part, for example a core, of a bi-component filament 14 may be made of second polymer that is provides an improvement over using the first polymer alone. For example, the second polymer may be stronger, or less expensive, or both, relative to the first polymer.

The filaments 14 shown in FIG. 1 are bi-component fibers spun with a core of polyethylene terephthalate (PET) and a sheath of polyvinylidene fluoride (PVDF). The core is about 70-90% of the cross-sectional area. The PET is a strong material that has mechanical characteristics suitable for reinforcing or supporting membranes. PVDF by comparison is a relatively weak material. However, the PVDF sheath has an affinity for a PVDF and NMP based membrane dope. Such a dope may be used to form the membrane wall 16 using a NIPS process.

The affinity between the outer surface polymer of the filaments 14 and the dope discourages air bubbles and encourages contact between the filaments 14 and the membrane wall. Alternatively, the surface of filaments 14 may also be modified or treated to promote bonding to the membrane dope. Such treatments can include, for example, plasma or chemical etching. The treatment is chosen to be appropriate for the materials of the filament 14 and the dope. Alternatively or additionally, as described above, filling the reinforcing filament passages with a solvent compatible with the dope also discourages air bubbles and encourages contact between the filaments 14 and the polymer wall.

EXAMPLE

Figure 11:
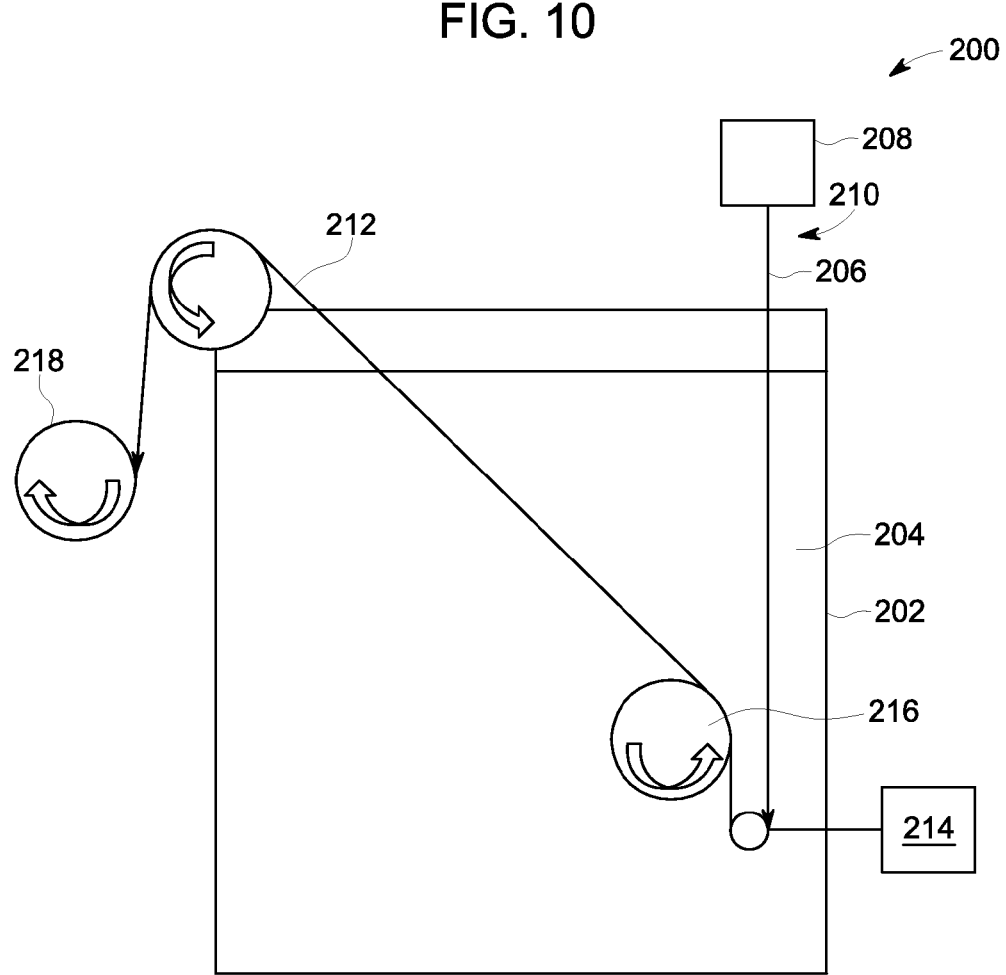
FIG. 11 is a schematic view of a coagulation bath with a tension gauge used in an experimental example.

FIG. 11 shows a modified coagulation bath 200 that used in experimental tests. A tank 202 was filled with a quenching solution 204, primarily water, to form membranes from a PVDF in NMP based dope by a NIPS process. Experimental coating nozzles 208 was placed over the tank 202 and oriented such that a precursor fibre 206 would fall vertically through an air gap 210 and then into the quenching solution 204. In the tank 202, the precursor fibre 206 passed over a tension gauge 214 and a lower roller 216. After leaving the tank, the product fibre 212 passed over an upper roller before being taken up on a winder 218. The winder 218 applied the force necessary to pull reinforcing yarns through the experimental nozzles 208 at a constant line speed. The tension gauge 214 measured the applied force, and therefore the tension on the precursor fibre 206.

Three nozzles 208 were tested. The first two nozzles were generally as shown in U.S. patent application Ser. No. 13/328,761 filed on Dec. 16, 2011, which is incorporated by reference. In these nozzles, reinforcing yarns pass through a middle passage containing dope. The middle passage ends in a first annular region located around a bore fluid needle and upstream of the exit plane of the nozzle. Dope wetted filaments pass from the first annular region into a downstream second annular region surrounding the bore fluid needle. A second flow of dope is injected into this second annular region. The dope with embedded reinforcing filaments leaves the second annular region and the exit plane of the nozzle. A third nozzle was a modified version of a second of the first two nozzles. In this modified nozzle, (a) the first annular region carrying reinforcing filaments from the middle passage was extended to the exit plane of the nozzle, (b) the supply of dope to the middle passage and first annular region was stopped, and (c) the bore fluid needle was replaced with an inner dope needle. Accordingly, the third nozzle resembled the nozzle 100 of FIG. 1 except that it had no bore fluid needle and so produced a solid fibre rather than a hollow fibre. Although it produces a solid fibre, the third nozzle confirms that two flows of dope can envelope a reinforcing yarn when both flows of dope and the reinforcing yarn are discharged from a common plane.

In preliminary tests, it was determined that there was no material tension (less than 10 g) when passing reinforcing yarns alone through the first or third nozzle, and when passing dope alone through the first nozzle. However, when two reinforcing yarns and dope were passed through the nozzles at a line speed of 90 feet per minute (fpm), the first and second nozzles required a tension of about 118 and 130 g respectively. The third nozzle, however, required a tension of only about 22 g. At a line speed of 50 fpm with two reinforcing yarns, the first nozzle required a tension of about 93 fpm and the third nozzle required a tension of about 17 g. The second nozzle was not tested under these conditions. These tests indicated that the third nozzle resulted in a significant reduction in tension on the precursor fibre 206.

In one other test, the second nozzle was used with one reinforcing yarn at a line speed of 90 fpm and required about 62 g of tension. The first nozzle was tested with one reinforcing yarn at a line speed of 50 fpm and required about 58 g of tension. Considered in combination with the tests described above, these tests indicate that for a given nozzle the required tension is influenced mostly by, and roughly proportional to, the number of reinforcing yarns. Tension is also influenced by line speed, although to a lesser extent. Overall, these tests suggest that the primary cause of tension is the movement of a reinforcing yarn at line speed through a relatively slow moving volume of dope in a chamber or passage of the nozzle.

The experiments also demonstrated that changing to the third nozzle design resulted in a greater reduction in tension than either a reduction in line speed or a reduction in the number of reinforcing yarns. We expect that this will result in less distortion of a hollow fibre membrane particularly as it is pulled around a lower roller 216. Alternatively, a faster line speed or reduced coagulation tank depth could be used with the third nozzle while producing a similar quality membrane compared to the first or second nozzle. It was also observed that no dope leaked out of the third nozzle through the inlets to the reinforcing yarn passages even though no seals were provided at the reinforcing yarn inlets.

This written description uses examples to disclose the invention and also to enable any person skilled in the art to practice the invention. The scope of the invention is defined by the claims, and may include other examples that occur to those skilled in the art.

The invention claimed is:

1. A process for making a hollow fiber membrane comprising the steps of,
   a) passing a bore fluid through a nozzle and discharging the bore fluid from a front face of the nozzle;
   b) passing a dope through a dope passage of the nozzle and discharging the dope from the dope passage in a ring around the bore fluid from the front face of the nozzle;
   c) passing a reinforcing yarn through a reinforcing yarn passage, wherein the reinforcing yarn passage is not in communication with the dope passage until the reinforcing yarn exits from a reinforcing yarn outlet through the nozzle; and
   d) introducing the reinforcing yarn into contact with the dope after the reinforcing yarn exits from the reinforcing yarn outlet.

2. The process of claim 1 wherein the reinforcing yarn is first introduced into contact with the dope within 5 mm of the front face of the nozzle.

3. The process of claim 1 wherein the reinforcing yarn is a multifilament yarn, a monofilament or a thread.

4. The process of claim 3 wherein the reinforcing yarn is a multifilament yarn.

5. The process of claim 4 wherein the reinforcing yarn comprises filaments comprising a polymer that is wetted by the dope or filaments that are surface treated to encourage wetting by the dope.

6. The process of claim 4 wherein the filaments of the reinforcing yarn are generally untwisted such that the reinforcing yarn is not classified as a twisted yarn.

7. The process of claim 1 wherein the reinforcing yarn comprises a polymer that is also present in the dope.

8. The process of claim 1 wherein the reinforcing yarn is wetted with a solvent before it contacts the dope.

9. The process of claim 1 further comprising passing additional dope through the nozzle and discharging the additional dope in a second ring around the bore fluid from the front face of the nozzle, wherein the reinforcing yarn is discharged between the ring of dope and the second ring of additional dope.

10. The process of claim 1 comprising introducing multiple reinforcing yarns into contact with the dope each from a separate discharge outlet.

11. The process of claim 1 wherein the reinforcing yarn is discharged from a reinforcing yarn passage located within 3 mm along the length of the nozzle from where the dope is discharged from the dope passage.

12. The process of claim 1 wherein any dope or bore fluid in communication with the reinforcing yarn is maintained at a pressure insufficient to cause the dope or bore fluid to flow through a reinforcing yarn passage of the nozzle.

* * * * *